Dec. 21, 1965          J. DE MENT          3,224,236
NOBLE GAS FLASH LAMP AND LASER LIGHT SOURCE
Filed July 15, 1963
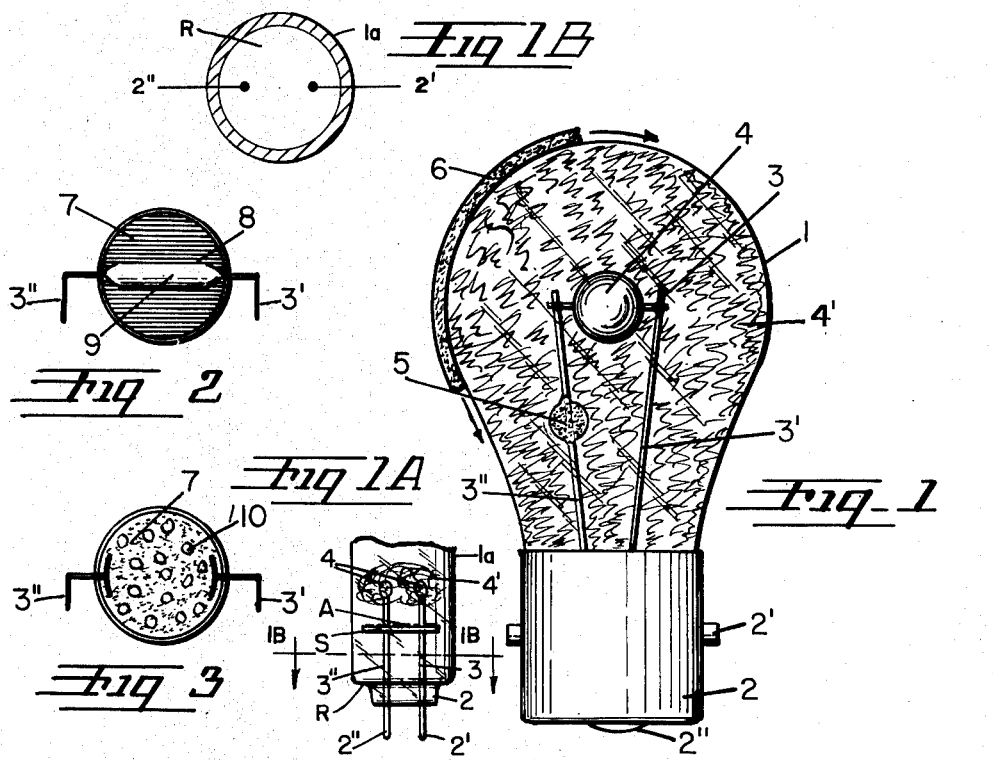
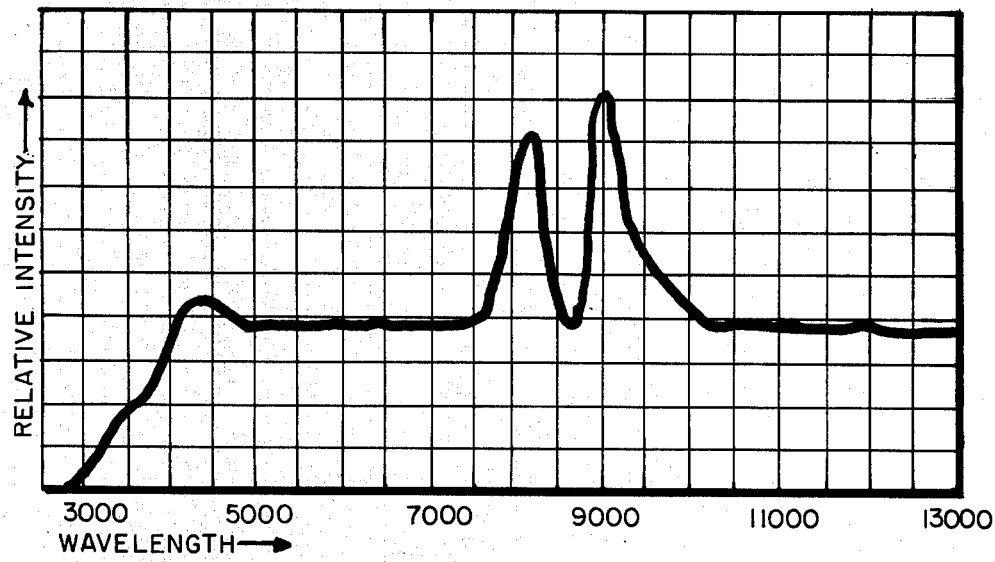
Fig 4
INVENTOR.

United States Patent Office 3,224,236
Patented Dec. 21, 1965

3,224,236
NOBLE GAS FLASH LAMP AND LASER
LIGHT SOURCE
Jack De Ment, 1717 NE. 19th Ave., Portland, Oreg.
Filed July 15, 1963, Ser. No. 295,006
25 Claims. (Cl. 67—31)

This invention relates to an improved light flash bulb and to a flash lamp laser as well as to an explodable chemical light source characterized by high brilliancies, high color temperatures, and special and specific spectral emission qualities.

For purposes of this disclosure, I employ the term "explodable" as equivalent to other such terms, as for example "combustible" and "deflagratable," wherein there is chemical reaction of solid material at a substantially high rate with, at most, low order detonation or shock production.

It is an object of this invention to provide methods and means for the optical pumping of lasers wherein the optical pumping light is derived from chemical reaction.

It is another object of this invention to provide a laser light ray system characterized as internally pumped in a male pumping to female lasering arrangement.

It is an object of this invention to provide a noble gas flash lamp of the metal filament of foil and/or light flash producing "paste" pellet kind wherein the light producing composition, contained in a transparent glass or like envelope, is provided with an electrical base having lead wires which supply triggering electricity, as from a battery, to cause the flash bulb to emit a bright pulse of light.

It is also an object of this invention to provide an improved flash bulb characterized as of the combustible chemical light source variety triggered by an electric current which emits light of a color corrected nature by virtue of novel features hereinafter set forth.

It is a further object of this inventtion to provide an improved flash bulb characterized as emitting large light fluxes substantially uniformly spread over the visible portion of the spectrum.

It is an object of this invention to provide a noble gas flash bulb of the explosive chemical variety characterized by features of spectral emission common to certain high pressure gas arcs, as for example the xenon arc.

Other objects of this invention will be evident to those skilled in the art from the specification and drawings which follow:

Light flash lamps currently employed in the photographic and related arts depend upon explodable chemical light sources for their light output. These include dry paste or pellet of materials such as zirconium hydride, foil and filaments of zirconium, aluminum, magnesium and the like, with and without an oxygen or other atmosphere. As is well known in the art, these bulbs typically consist of a glass enevolpe and a socket, with lead wires for electrical detonation. The bulbs range in a variety of sizes and modifications, but all have the common limitation of producing light at a color temperature that lies in the range of 3800° K. or less. In order to raise the apparent color temperature a blue tinted envelope or envelope covering (usually tinted plastic) is employed, giving a color temperature of 6000° K. In a typical form of the present invention I find that the inclusion of decomposable solid compounds of the noble gases, preferably xenon, imparts a number of desirable characteristics, including increased color temperature, enhanced light output, and more uniform spectral distribution.

When I speak of "flash lamp" herein I generally designate a visible light emitting flash bulb. However, I do not exclude certain specialty modifications for the untraviolet and the infrared portions of the spectrum, as is explained hereinafter. For the ultraviolet, substantial outputs are to be had to 3000 A., and for the infrared, in the case of the xenon modification of this invention, the output is especially rich in the region covering approximately 8800 to 10,000 A. or the so-called near-infrared which is widely employed for medical and industrial and like specialty photography.

In the drawings:

FIG. 1 shows inside-elevation and semi-perspective view a flash lamp embodying a light emitting structure therein to illustrate features and principles of this invention;

FIG. 1A shows in side-elevation a modified form of the invention;

FIG. 1B is a sectional view taken on the line 1B—1B of FIG. 1A;

FIG. 2 shows in top section a modified form of light emitting structure apart from the rest of the flash bulb structure;

FIG. 3 is similar to FIG. 2 but shows a further modification of light emitting structure; and FIG. 4 is a plotting illustrating light intensity versus wavelength (in Angstrom units) for a typical loading of solid xenon compound not, however, having superimposed upon the curve the spectral output and distribution of explodable chemical light producing material such as thin metal or compacted paste or pellet.

The drawings in more detail:

In FIG. 1 there is shown in side-elevation a typical flash bulb or explodable chemical light flash lamp, including a gas-tight, transparent envelope 1 of say, glass, fused silica or the like and of any convenient geometry, provided with an electrical base or socket member 2 having electrical contacts 2' and 2". Member 2 will be recognized by those skilled in the art as a typical structure, a number of modifications and designs of which are known, e.g., double pin, bayonet, screw, and hence is not to be construed as limiting for purposes of this invention. Likewise, envelope 1 may be of varied geometry, including spheroid, cylindrical, or the like, with electrical contacts 2' and 2" in any desired spatial relationship. In electrical communication with 2' and 2" are spaced wire lead and support members 3' and 3"; bridging 3' and 3" is member 3, which corresponds to a heater or resistance bridge which heats up when an electrical current is passed through 3 via 3' and 3". Element 4 depicts a light producing chemical pellet or like mass, with or without a decomposable solid noble gas compound. Within the envelope 1 there may be thin metal or like reactive, light emitting material 4', as for example foil or filament, with or without an atmosphere of gas such as oxygen. Depending upon the modification of this improvement there may be affixed to one of the lead wires, preferably near 4, a bead 5 which comprises a getter to absorb gas released over long periods by the solid noble gas compound, or, as desired, member 5 consists of solid noble gas compound. The surface of 1 may be coated with a plastic or like composition 6 which is multifunctional in that it serves to minimize shattering of the envelope 1, also to absorb unwanted heat when the optical region of the spectrum is involved. I prefer plastic coatings which are refractively matched with the envelope 1, so as to reduce light loss by fresnel reflection. As desired, 6 may be plastic filter, many kinds of which are known in the art and need not be described in detail here, having selective band passes in the ultraviolet or the infrared portions of the spectrum.

In FIG. 1A there is depicted yet another form of this invention wherein 1 is the envelope having a heat-pinched base or socket-equivalent member 2 through which run two spaced electrical contact or firing wires 2' and 2" (outside the envelope 1), the said wires 2' and 2" within the envelope 1 being designated as lead and support wire members 3' and 3". These extend say halfway into the length of the envelope 1, each having affixed to its end a globule or pellet 4 of explodable light-producing composition. Between elements 3' and 3" there is a bridge member S, which may be of any convenient geometry, e.g., circular, oval, or the like, of heat-resistant dielectric, e.g., pressed or compacted glass wool, asbestos. Spacer or bridge member S is positioned immediately below 4. On the top surface of S there is carried noble gas releasing composition A; this may be particles of noble gas compound or the compound admixed with preparation of the kind 4 is composed of, e.g., in proportion of between several percent and approximately 80 percent of the latter; or, A may be noble gas releasing composition in particulate form enmeshed in a randomly clumped wad of metal filament or loosely crumpled within metal foil. As is apparent, the function of the composition 4, as well as the metal filament or foil, is to provide an initial burst of heat to decompose the noble gas releasing material. Optionally, the structure may carry 4', metal filament or foil loosely filling the envelope.

FIG. 2 shows in side-elevation a typical structural modification taken from elements 3 and 4 of FIG. 1, wherein 3' and 3" are the electrical leads as just described, 7 is explodable chemical light producing composition in pellet or like form having embedded in its interior a thin sandwich made up of say thin nickel foil or suitably metallized fluorocarbon plastic (metallized on the interior) 8, which electrically bridges 3' and 3", and which is provided with a filling of solid noble gas compound 9.

FIG. 3 is similar to FIG. 2, showing yet another typical structural modification taken from elements 3 and 4 of FIG. 1, wherein 7 is the light emitting composition having particles 10 of heat decomposable solid noble gas compound distributed therein. Particles 10 may be of any convenient mesh size and may, in the case of relatively reactive solid noble gas compounds, e.g., fluorides of xenon, be metallized with a metal such as nickel or otherwise lightly coated, e.g., with fluorocarbon, to minimize reaction with material 7 in case of substantial storage periods.

FIG. 4 has been previously described.

While a number of heat decomposable solid noble gas compounds can be used in this invention to supply via quick decomposition a noble gas atmosphere, I prefer certain xenon compounds, as for example, the xenon fluorides. One of these may be taken for illustration:

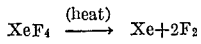
$$XeF_4 \xrightarrow{(heat)} Xe + 2F_2$$

The xenon tetrafluoride is a colorless, crystalline solid which is stable at room temperature, has a vapor pressure of several millimeters of mercury, and is storable in silica, Pyrex, nickel and fluorocarbon (polychlorotrifluoroethylene) containers. The thermal decomposition of $XeF_4$ releases the xenon which very strongly luminesces as a result of the energy dynamics occuring within the flash lamp, while at the same time the fluorine freed from its bound and non-available form becomes available for reaction with the metal foil, filament or like composition, with or without oxygen or other gas that may be present in the system. Xenon difluoride and various xenon oxyfluorides resemble xenon tetrafluoride. Compounds of krypton and fluorine are similar, although less stable.

In order that the less stable noble gas compounds, i.e., those which may slowly release fluorine over long periods or at reduced pressures, may be employed, there can be incorporated into the system a getter substance (FIG. 1, element 5) such as alkali fluoride or alkaline earth oxide. Decomposition may also be retarded by counterbalancing the vapor pressure of the noble gas with an internal pressure greater than that of the vapor pressure of the noble gas emitter at ambient temperatures. Furthermore, for such specialty applications as the chemical-optical pumping of a laser resonator, where the light flash system incorporates a noble gas compound that is relatively unstable or slowly decomposable at say room temperature, as is the case with krypton tetrafluoride (which breaks down at a rate of 0.1 percent per hour at room temperature), the shelf life can be substantially extended by storing the light flash lamps in a cryostat which as is well known is a refrigeration device providing supercooling usually derived from liquified gases such as nitrogen or oxygen. Such cooling obviously reduces the vapor pressure and, therefore, articles, such as the pellets 4 of FIG. 1, have a longer shelf life.

I particularly point out the flash lamp laser modification, FIGS. 1A and 1B of this invention as of the same general construction depicted in the accompanying drawings with the exception that the envelope 1a is a lasering material, such as rare earth doped glass, ruby, or the like in suitable optical configuration, as for example a hollow cylinder or cup laser resonator having one output end closed and the opposite end fitted with the electrical and explodable chemical light source elements as shown in the figures, the end provided with the fittings being cut in the form of a roof prism or reflectively coated, on its inner surface as at R.

Furthermore, for re-use purposes the laser glass, crystal, or like envelope 1 may be reloaded with new pumping charges, including socket or its equivalent, electrical lead wires, metal of large surface area, light emitting explodable pellet, heat decomposable solid noble gas compound, and the like, as shown in the illustrations.

The amount of heat decomposable solid noble gas compound used per flash bulb or laser can vary according to the particular size and design modification. Generally, the interior pressures range from several millimeters of mercury to several atmospheres of pressure. It is therefore apparent that a wide range of loading quantities of the gas compound can be employed, and that in this regard I do not wish to be limited in scope. Those skilled in the art can readily calculate the amount of solid noble gas compound to be employed in a given modification of this invention by means of the usual gas laws. Thus, 1.15 grams of krypton tetrafluoride, upon thermal decomposition above approximately 60° C. yields up to 500 cubic centimeters each of krypton and fluorine gases (at normal temperature and pressure). Similar parameters generally apply to the various xenon fluorides and xenon oxyfluorides and, in the event that the application is directed to the so-called exotic and sophisticated areas of research, to the various radon fluorides.

The gas pressure provided within the envelope of the flash lamp can be provided by partial pressure to superatmospheric pressure oxygen, or by certain gases which are inert as regards the noble gas releasing material but reactive as regards the metal light producing reactant. Many such combinations can be had and need not be recited in detail herein, except to point out that gases like carbon dioxide and nitrogen are generally inert atmospheres for noble gas compounds and reactive with certain metals characterized as presenting a large surface area, as in the case of hair-like filaments and very thin foils. Metals which react with nitrogen or nitrous oxide include magnesium, tin, zirconium, magnesium-aluminum alloys, and dowmetal and elektron alloys. Dowmetal, elektron, magnesium, magnesium-aluminum alloys, titanium and zirconium luminously ignite in pure carbon dioxide.

In addition to the aforementioned metals and alloys, large surface area metals and semimetals other than the aluminum, magnesium and zirconium previously recited can be used in an atmosphere of oxygen. These include the following examples, with light outputs (in millions of lumens) per gram per millisecond of flash: tantalum, 185; tungsten, 40; molybdenum, 70; cerium, 65. In the case of magnesium and aluminum the values range between approximately 1000 and 1500 megalumens per gram per millisecond and, as in the case of the just recited metals, may exceed these typical figures.

Finally, it is highly preferable that the flash lamp and/or laser light unit, whichever the case may be, be as free of moisture as possible. This is accomplished by the use of noble gas compounds which contain no adsorbed moisture, also by following good sealing techniques. It may be desired to include a small, loose bead of desiccant within the lamp envelope, also to employ moisture indicating material coated on the inside surface of the envelope, e.g., cobalt compounds which change color in the presence of traces of water, a practice known to those skilled in the art.

I claim:

1. An explodable chemical light flash lamp which comprises a gas tight transparent envelope provided with two spaced electrical lead wires passing thereinto and having in communication with the interior of said envelope a pallet of light producing explodable chemical composition affixed to the ends of the said lead wires in the interior of said envelope, said explodable chemical composition characterized as emitting light upon the explosion thereof, and a small mass of heat decomposable, solid noble gas compound contained within said envelope, the said noble gas compound characterized as releasing noble gas upon the explosion of the said pellet, whereby upon passage of an electrical current through the said lead wires the pellet explodes and the noble gas compound decomposes with the release of noble gas to enhance the luminosity of the light producing explodable chemical composition.

2. An explodable chemical light flash lamp as set out in claim 1 wherein the said solid noble gas is a xenon compound.

3. An explodable chemical light flash lamp as set out in claim 1 which includes light producing metal as the said light producing explodable chemical composition, said metal being characterized as having a large surface area and loosely aggregated within the said envelope.

4. An explodable chemical light flash lamp as set out in claim 3 wherein the said noble gas compound is a xenon compound.

5. An explodable chemical light flash lamp as set out in claim 2 which includes a transparent envelope of lasering material and a reflective end portion.

6. An explodable chemical light flash lamp as set out in claim 3 which includes a transparent envelope of lasering material and a reflective end portion.

7. An explodable chemical light flash lamp as set out in claim 4 which includes a transparent envelope of lasering material and a reflective end portion.

8. An explodable chemical light flash lamp which comprises a gas tight transparent envelope provided with an electrical base member affixed thereto, said base member being in communication with two electrical lead wires, an ignition bridge between the said lead wires, a small mass of heat decomposable solid noble gas compound mounted upon the said ignition bridge such that the said compound decomposes upon heating of the bridge and releases noble gas, a loose aggregation of thin metal within the said envelope, and an atmosphere of metal reactive gas within the envelope, such that upon passing an electrical current through the said ignition bridge the said noble gas compound decomposes and releases noble gas and the said thin metal explodes with the release of light carrying luminosity qualities characteristic of the said noble gas.

9. An explodable chemical light flash lamp as set out in claim 8 wherein the loosely packed mass of thin metal is metal foil and the said atmosphere of metal reactive gas is oxygen, and the said noble gas compound contains xenon.

10. An explodable chemical light flash lamp as set out in claim 8 wherein the loosely packed mass of thin metal is metal filament and the said atmosphere of metal reactive gas is oxygen, and the said solid noble gas compound contains xenon.

11. An explodable chemical light flash lamp as set out in claim 8 wherein the said mass of solid noble gas compound contains xenon.

12. An explodable chemical light flash lamp as set out in claim 9 which includes a transparent envelope of lasering material and a reflective end portion.

13. An explodable chemical light flash lamp as set out in claim 10 which includes a transparent envelope of lasering material and a reflective end portion.

14. An explodable chemical light flash lamp as set out in claim 11 which includes a transparent envelope of lasering material and a reflective end portion.

15. An explodable chemical light flash lamp which comprises a gas tight transparent envelope provided with two spaced electrical leads passing to the exterior of the envelope and sealed in the walls thereof, an ignition bridge between the said lead wires within the envelope, a small mass of heat decomposable solid xenon compound mounted upon the said ignition bridge, a loosely aggregated mass of gas reactive metal within the said envelope, said metal characterized as having a high surface area, and an atmosphere of gas reactive with the said metal within the envelope, whereby passage of an electric current through the lead wires to the ignition bridge causes the explosion of said metal concurrently with the decomposition of the xenon compound and the release of xenon gas thereby so as to produce a flash of light.

16. An explodable chemical light flash lamp as set out in claim 15 wherein the said ignition bridge includes a pellet of light producing explodable chemical composition affixed to the ends of the said lead wires.

17. An explodable chemical light flash lamp as set out in claim 15 wherein there is included a dielectric spacer bridge member between the said electrical leads, said bridge member being mounted below the said ignition bridge and carrying the said xenon compound on its surface.

18. An explodable chemical light flash lamp as set out in claim 16 wherein there is included a dielectric spacer bridge member between the said electrical leads, said bridge member being mounted below the said pellet and carrying the said xenon compound on its surface.

19. An explodable chemical light flash lamp as set out in claim 16 which includes a transparent envelope of lasering material and a reflective end portion.

20. An explodable chemical light flash lamp as set out in claim 17 which includes a transparent envelope of lasering material and a reflective end portion.

21. An explodable chemical light flash lamp as set out in claim 18 which includes a transparent envelope of lasering material and a reflective end portion.

22. The method of producing a flash of light which comprises the steps of: juxtapositioning a heat decomposable solid noble gas compound with a gas reactive metal within a gas tight transparent envelope, said gas reactive metal characterized as being in loose aggregation and having a large surface area, surrounding the said gas reactive metal and the said noble gas compound with an atmosphere of gas characterized as reactive with the metal and substantially non-reactive with the said noble gas compound, and igniting the said metal, whereby to cause the said metal to react with the said gas to produce light and heat, and the said heat being sufficient to cause the decomposition of the noble gas compound with the release of light emitting noble gas by the said compound.

23. The method of producing a flash of light as set out in claim 22 wherein the noble gas compound decomposes to release a metal reactant gas together with a noble gas.

24. The method of producing a flash of light as set out in claim 22 wherein the said gas tight transparent envelope is a laser resonator.

25. The method of producing a flash of light as set out in claim 23 wherein the said gas tight transparent envelope is a laser resonator.

References Cited by the Examiner

UNITED STATES PATENTS

| | | | |
|---|---|---|---|
| 1,983,394 | 12/1934 | Ostermeier | 67—31 |
| 2,011,771 | 8/1935 | Miller | 67—31 |
| 2,013,371 | 9/1935 | Van Liempt et al. | 67—31 |
| 2,208,439 | 7/1940 | Suits | 67—31 |
| 2,272,059 | 2/1942 | De Margitta | 67—31 |
| 2,305,561 | 12/1942 | Sylvester | 67—31 |
| 2,305,609 | 12/1942 | Eaton | 67—31 |
| 2,375,742 | 5/1945 | Kalil et al. | 67—31 |
| 2,816,406 | 12/1957 | Eppig | 67—31 |

FOREIGN PATENTS 551,670  6/1932  Germany.

OTHER REFERENCES

Publication: R.C.A. News Release, March 7, 1963, 4 pp.

EDWARD J. MICHAEL, *Primary Examiner*.